United States Patent [19]

Kilpeläinen et al.

[11] Patent Number: 4,594,384
[45] Date of Patent: Jun. 10, 1986

[54] ADHESIVE COMPOSITION PARTICULARLY FOR MANUFACTURING WOOD CONSTRUCTIONS, PANELS AND OTHER SIMILAR WOOD PRODUCTS

[75] Inventors: Harri Kilpeläinen, Vantaa; Pentti Kankaanpää, Kerava, both of Finland

[73] Assignee: Valtion Teknillinen Tutkimuskeskus, Finland

[21] Appl. No.: 684,606

[22] Filed: Dec. 21, 1984

[51] Int. Cl.$^4$ .................. C10F 9/00; C09J 3/14; C08L 61/12
[52] U.S. Cl. ................ 524/705; 524/60; 524/65; 524/74; 524/78; 524/735; 524/841; 525/54.5; 527/403; 527/503; 528/1
[58] Field of Search .............. 524/78, 65, 74, 60, 524/705, 841, 735; 527/503, 403; 528/1; 525/54.5

[56] References Cited

U.S. PATENT DOCUMENTS

| | | | |
|---|---|---|---|
| 3,293,200 | 12/1966 | MacGregor | 524/74 |
| 3,294,715 | 12/1966 | Bryner | 524/65 |
| 3,533,988 | 10/1970 | Morris | 524/65 |
| 4,514,532 | 4/1985 | Hsu | 528/1 |

FOREIGN PATENT DOCUMENTS

| | | | |
|---|---|---|---|
| 686765 | 5/1964 | Canada | 527/403 |
| 344086 | 3/1931 | United Kingdom | 524/65 |
| 0854962 | 8/1981 | U.S.S.R. | 524/74 |

OTHER PUBLICATIONS

Rose, *The Condensed Chemical Dictionary*, 7th edition; pp. 483, 556.

*Primary Examiner*—C. Warren Ivy
*Attorney, Agent, or Firm*—McGlew and Tuttle

[57] ABSTRACT

The present invention relates to an adhesive composition for manufacturing glued laminated beams and wood constructions. One component of the adhesive composition is resorcinol-phenol resin. Resorcinol-phenol adhesives are as such known in the prior art. The main ingredients of these adhesives are resorcinol, formaldehyde and phenol. Among the drawbacks in the use and production of resorcinol-phenol adhesives are their high price and the fact that the raw materials are difficult to obtain. The purpose for employing the adhesive composition of the invention is to eliminate some of the difficulties connected with the availability of the raw materials, particularly resorcinol, and to help produce a new, more economical resorcinol-phenol based adhesive composition. Part of the resorcinol-phenol resin used in the adhesive composition is replaced by a humus substance extract made of peat, preferably decomposed peat, or by a commixture made of humus substance extract and formaldehyde, providing an adhesive composition according to the invention which contains 40–90% by weight resorcinol-phenol resin, the dry matter content whereof is 30–60% by weight and 10–60% by weight humus substance extract made from peat. Into this adhesive composition there is added, before use, some generally known hardener such as formaldehyde at 5–20% by weight. Into the humus substance extract of the adhesive composition may be added 10–20% by weight formaldehyde.

4 Claims, No Drawings

ADHESIVE COMPOSITION PARTICULARLY FOR MANUFACTURING WOOD CONSTRUCTIONS, PANELS AND OTHER SIMILAR WOOD PRODUCTS

FIELD AND BACKGROUND OF THE INVENTION

The present invention relates to an adhesive composition for manufacturing wood constructions, panels and other similar wood products, one component of the adhesive composition being resorcinol-phenol resin.

Resorcinol-phenol adhesives are as such known in the prior art. The main ingredients of these adhesives are resorcinol, formaldehyde and phenol. The adhesive is manufactured in a reactor where the ingredients are put under a suitable pressure and temperature. The reaction is interrupted at the precondensation stage. If the adhesive is used, for instance, in the manufacturing of glued laminated beams and other wood constructions, the reaction is completed by adding a hardener, for instance formaldehyde, to the composition.

Among the drawbacks in the use and production of resorcinol-phenol adhesives are their high price and the fact that the raw materials are difficult to obtain.

SUMMARY OF THE INVENTION

The purpose for employing the adhesive composition of the invention is to eliminate some of the difficulties connected with the availability of the raw materials, particularly resorcinol, and to help produce a new, more economical resorcinol-phenol based adhesive composition. The invention is characterized by the novel features set forth in the appended patent claims.

DETAILED DESCRIPTION OF THE PREFERRED EMBODIMENTS

The adhesive composition of the present invention brings forth the following advantages compared to the currently used resorcinol-phenol adhesives. Part of the resorcinol-phenol resin used in the adhesive composition can be replaced by a humus substance extract made of peat, preferably decomposed peat, or by a commixture made of humus substance extract and formaldehyde. Experiments have shown that roughly half of the adhesive composition can be replaced by the humus substance extract. The extract is easy to produce, and so is the adhesive composition according to the invention. In countries where there are bogs or mire terrains, peat is always available. The humus substance extract can also replace various fillers, for instance wood dust, currently used in resorcinol-phenol adhesives. This extract is remarkably cheaper than resorcinol-phenol resin. The price ratio at present is about 1:10. Moreover, the adhesive composition of the present invention provides for a strong, weather-proof adhesion which fulfils the requirements of the so-called exterior adhesion class stipulated in the wood construction standards and norms in several countries.

Humus substance extract has not earlier been utilized as the raw material of adhesives. The initial material of the humus substance extract is the decomposed or semi-decomposed section of peat. The structure of the peat layer from the ground surface, i.e. from the slightly decomposed top layer, down to the decomposed bottom layer is illustrated in the appended Table 1. The decomposition rate is measured according to the scale H1-H10 (Humidification value).

Decomposed peat contains the greatest proportion, about 50-60%, of humus substance, the utilization whereof is the main point of the present invention.

TABLE 1

| PEAT LAYER | |
|---|---|
| SLIGHTLY DECOMPOSED H1-H3 | CARBOHYDRATES 30-50% LIGNIN 30-40% HUMUS SUBSTANCE 0-5% |
| SEMI-DECOMPOSED H5-H6 | CARBOHYDRATES 15-40% LIGNIN 5-30% PEAT WAXES AND RESINS 5-15% HUMUS SUBSTANCE 20-30% |
| DECOMPOSED H9-H10 | CARBOHYDRATES 0-2% LIGNIN 5-20% PEAT WAXES AND RESINS 5-20% HUMUS SUBSTANCE 50-60% |

Humus substances, particularly humic acids, contain polyphenolic compounds, the origin and structure whereof still remains partly unknown. According to two popular theories, they are created either (a) when lignin is decomposed due to the influence of microorganisms (the lignin theory) or (b) in a micro-biological process from the carbohydrates and proteins of dead plants (the polyphenol theory). The structure of polyphenolic compounds resembles that of phenolic acid and tannin. Part of the basic structure is formed of gallic acid, i.e. the same substance which is one of the main components in quebracho extracts and in bark extracts. In the adhesive composition according to the invention, formaldehyde reacts with the activated carbon which takes up the 6-position of the gallic acid, and forms a polymer of the phenol resin type. In addition to this, the humic acids contain resorcinol, which also forms a strongly-bound polymer with formaldehyde even at a low temperature.

The major part of humus substances, i.e. the humic acids, can be separated from peat by means of alkaline water solution. It is pointed out that the employed alkaline water solutions are mild $\leq 5\%$, in which case the lignin contained in the peat is not separated into the extract but remains in the solid matter.

The present invention is illustrated in more detail in the following examples describing the production methods of the humus substance extract and the adhesive composition.

Production of humus substance extract from peat by means of alkaline solution

When peat is extracted in a mild 1-5% NaOH water solution, the weight proportions of the various ingredients are for example the following:

For example:
1 part by weight dry peat (ground)
10 parts by weight distilled water
10% by weight NaOH (of the dry peat amount)

The ingredients are put in a vessel where the temperature is raised up to 80° C., and the composition is continuously mixed. The treatment is carried out for 1 hour. Thereafter solid matters are separated from the extract solution by means of a centrifugal air-separator. The solids are removed and the extract solution is recovered and dried for instance in an incubator at a temperature of 50° C. The extract recovery of the peat extract extracted in this fashion is about 60% of the dry peat amount.

1. Production of humus substance extract adhesion composition

The humus substance extract is ground fine in a hammer mill or in a disc refiner, where the blade position is 0.2 mm. The weight proportions of the ingredients in the composition are:

1 part by weight humus substance extract
2 parts by weight water.

A desired amount of the composition obtained in this fashion is added to a given resorcinol-phenol resin amount.

2. Production of humus substance extract adhesion composition

The humus substance extract is ground fine in a hammer mill or in a disc refiner after the same fashion as above. Paraformaldehyde is added to the extract. The weight proportions of the ingredients in the composition are:

1 part by weight humus substance extract
10–20% by weight paraformaldehyde of the extract weight
2 parts by weight water A desired amount of the composition obtained in this fashion is added to a given resorcinol-phenol resin amount.

The preferable ingredient proportions in the adhesion composition of the invention, i.e. in the humus substance adhesion composition, are the following:

resorcinol-phenol resin 40–90% by weight. The dry matter content thereof is 30–40% by weight.

humus substance extract made of peat 10–60% by weight, which extract is prepared for example according to the production methods described above.

An amount of water, 0–20% by weight, can be added to the composition in order to provide for the necessary viscosity. Before using the adhesion composition, an amount of some hardener, 5–20%, is added thereto. For instance formaldehyde can be used as the hardener.

EXAMPLE 1

An adhesion composition according to Table 2 was made of humus substance extract and resorcinol-phenol resin per the present invention. The composition of a respective ordinary or known resorcinol-phenol (RF) adhesive is also presented in Table 2.

TABLE 2

| Ordinary RF adhesion composition | Extract adhesion composition |
|---|---|
| Resoroinol-phenol resin: | Resorcino-phenol resin: |
| 100 parts by weight | 50 parts by weight: |
| Hardener: (+ fillter): | Humus matter extract: |
| 15 parts by weight | 50 parts by weight |
| | Hardener: |
| | 15 parts by weight |

The adhesion composition according to the invention was employed for sizing a 6-lamellated glued laminated beam. The adhesive was spread by means of a spatula, and the adhesive amount was about 300 g/m$^2$; clamping pressure 8 kp/cm$^2$, pressure time 4 h, temperature 25° C. The measures of the ready-made test beam were: length 600 cm, height 190 cm (6 lamellas) and width 120 mm; material spruce. The beam was left to rest for 4 days in a 65% RH (relative humidity) condition. Thereafter test pieces were sawn off for the following tests:

(1) Delamination test according to the American Standard ASTM D 1101-59. In this test the test pieces are moistened and dried two times. The duration of the test is about 8 days.

(2) The glue joint block-shear test according to the American Standard ASTM D 905-49.

The test results were the following:

(1) The delamination test result was 5%;

(2) The glue joint block-shear test results were, as the average of 20 pieces, 9.29 N/mm$^2$, and wood failure 95%.

According to the Standard ASTM D 1101-59, the delamination percentage must not surpass 5% after the two-phase test. In the block-shear test of the Standard ASTM D 905-49, the glue joint shearing strength according to Nordic regulations must be at least 6 N/mm$^2$, and the wood failure must be at least 50%. The obtained results thus fulfil the stipulated requirements.

EXAMPLE 2

The commixture of peat extract and resorcinol-phenol adhesive was tested for adhesion at room temperature. The adhesive compositions are presented in Table 3.

TABLE 3

| Material | Composition (weight proportions) | | | |
|---|---|---|---|---|
| | U4 | U5 | U6 | V |
| Resorcinol-phenol resin (RF-30) | 45 | 40 | 43.5 | 87 |
| Hardener | 5 | — | — | 13 |
| Humus substance extract powder | 14 | 20 | 17 | — |
| Paraformaldehyde | 2 | 4 | 4 | — |
| Water | 34 | 36 | 34.5 | — |

The adhesive composition U4 was employed for sizing a beam made of 33×120 mm spruce boards, the length of which was 550 mm and height 165 mm (5 lamellas).

The adhesive spead amount was 400 g/m$^2$, pressure time 3.5 h, clamping pressure 8 kp/cm$^2$ and pressure temperature +25° C.

The glue joint shearing strength of the beam was measured according to the American ASTM-D 905 Standard (the block-shear test); the average shearing strength obtained for 20 test pieces was 9.5 N/mm$^2$, standard deviation 1.6 N/mm$^2$, and the characteristic shearing strength value 6.3 N/mm$^2$. The respective strength of the glue joint in glued laminated beam structures must be 6.0 N/mm$^2$.

The adhesive compositions U5, U6 and the normal or known RF-30 (V) adhesive were used for sizing the close-contact test pieces according to the B.S. 1204, which test pieces are used in the Nordic acceptance test for beam adhesives. The raw material employed was birch. The pressure time at room temperature was 5 hours. The test pieces were tested 2 days after the sizing. The received readings for the glue joint shearing strength were (average values for 10 pieces):
Adhesive composition U5:
  4.46 N/mm$^2$ dry
  3.93 N/mm$^2$ after 6 h boiling
Adhesive composition U6:
  4.79 N/mm$^2$ dry
Adhesive composition V:
  4.78 N/mm$^2$ dry Compared to the reference or known adhesive V (RF-30), the sizing quality with the humus extract adhesive composition, when tested dry, is as good when half of the RF resin is replaced by a mixture of humus extract and water (U6). The B.S. 1204 demand for the shearing strength of a glue joint after 6 hours' boiling is 2.4 N/mm², which is also easily surpassed when the humus extract—water mixture amount is even more than half of the amount of the RF resin.

We claim:

1. Resorcinol-phenol resin based aqueous adhesive composition, comprising a hardenable mixture of 40-90% by weight resorcinol-phenol resin, the dry matter content of which is 30-60% by weight, and 60-10% by weight humus substance extract prepared from peat, the percentages being based on the total composition, the extract being prepared by treating dry ground peat with an aqueous alkaline solution having an alkaline concentration of up to about 5% and sufficiently to extract into the solution the extractable humus content therefrom without extracting the lignin contained in the peat and such that the lignin remains in the solid matter of the peat and drying the alkaline solution extracted humus substance content, and grinding the dried humus substance content and then admixing it with water to form the extract, and including in the composition 5-20% by weight formaldehyde or paraformaldehyde based on the mixture as hardener.

2. Composition of claim 1, wherein the grinded dried humus substance content and water are admixed in the weight ratio of the humus substance content to water of about 1:1.8 to 2.4.

3. Composition of claim 1, wherein at least a portion of the hardener is included by preliminary addition to the extract in the amount of 10-20% by weight formaldehyde or paraformaldehyde based on the dried humus substance content.

4. Composition of claim 1, wherein up to 20% by weight of additional water is added to adjust the viscosity of the mixture.

* * * * *